(12) United States Patent
Chiu et al.

(10) Patent No.: US 7,010,190 B2
(45) Date of Patent: Mar. 7, 2006

(54) SILICON OPTIC BASED WAVELENGTH DIVISION MULTIPLEXING DEVICE

(75) Inventors: Chien-Hsiung Chiu, Baoshan (TW);
Chun-Sung Chien, Sinjhuang (TW);
Song-Fure Lin, Hsinchu (TW);
Pin-Sung Wang, Hsinchu (TW)

(73) Assignee: FOCI Fiber Optic Communications, Inc., Hsinchu (TW)

( * ) Notice: Subject to any disclaimer, the term of this patent is extended or adjusted under 35 U.S.C. 154(b) by 157 days.

(21) Appl. No.: 10/728,534

(22) Filed: Dec. 5, 2003

(65) Prior Publication Data
US 2005/0031258 A1    Feb. 10, 2005

(30) Foreign Application Priority Data
Aug. 6, 2003    (TW)    ............... 92214251 U

(51) Int. Cl.
*G02B 6/28*    (2006.01)
(52) U.S. Cl. ............... 385/24; 385/33; 385/34; 385/65
(58) Field of Classification Search ........... 385/24, 385/33–39, 52, 65, 74, 83, 88–93
See application file for complete search history.

(56) References Cited

U.S. PATENT DOCUMENTS 6,219,470 B1 *  4/2001  Tu  ............... 385/14

* cited by examiner

*Primary Examiner*—Phan T. H. Palmer

(57) ABSTRACT

The present invention discloses an optic based wavelength division multiplexer device made by a micro lithography and etching process, utilizing the special crystal lattice structure of a silicon wafer. The device comprises a silicon substrate with grooves, an input fiber optic of incoming port with its front lens, a fiber optic of pass port with its front lens, a fiber optic of reflect port with its front lens, and a thin-film filter. The fiber optics, lenses, and the thin-film filter are inserted into grooves to complete the fiber-to-fiber alignment and coupling. The present invention provides both functions of wavelength multiplexing and wavelength demultiplexing. The present invention also has the characteristics of automatic alignment and passive alignment.

41 Claims, 5 Drawing Sheets

SILICON OPTIC BASED WAVELENGTH DIVISION MULTIPLEXING DEVICE

FIELD OF THE INVENTION

The present invention relates to the optic communication field and, more particularly, to a method using micro lithography, etching and the special crystal lattice structure of the silicon wafer to manufacture an optic wavelength division multiplexing device.

BACKGROUND OF THE INVENTION

A wavelength division multiplexer (WDM) is used to merge lights with different wavelengths for transmission on the same optical fiber, or split lights with different wavelengths for transmission on separate optical fibers. The device is widely used in fiber optic communication networks, bi-directional transmission and CATV systems.

FIG. 1 of the attached drawings shows a thin-film filter WDM, comprising optical fibers 111, 112, 113, a dual-core collimator 121, a single-core collimator 122, and a thin-film filter 130. The thin-film filter WDM has the advantages of good optical characteristics, and high stability. However, it also has the disadvantages of requiring active alignment for assembly, and using expensive components, such as collimators.

FIG. 2 shows a fused-type WDM manufactured with the fused biconic taper technology to fuse the optical fibers 211, 212, 213 to form a WDM 220. The fused-type WDM has a low production cost. However, it also has the disadvantages of having poor optical characteristics, such as narrow pass bandwidth, and low wavelength isolation. It is important to find a method to manufacture a WDM with good optical characteristics at a low production cost.

SUMMARY OF THE INVENTION

The objective of the present invention is to provide a WDM that is good in automatic alignment, feasible in passive alignment, small in size, and low in production cost To achieve the foregoing objective, the present invention utilizes the special crystal lattice structure of the silicon wafer, uses a micro lithography and etching process to manufacture specific grooves, and moves the optical fibers, lenses, and thin-films into the grooves under the passive alignment conditions to manufacture a WDM for both multiplexing and demultiplexing lights.

The main feature of the present invention is that it does not require an adjustment base with a multi-degree of freedom for active alignment. Instead, the present invention is a high-precision alignment optic device with a high-precision passive alignment.

The silicon optic based WDM of the present invention comprises a silicon substrate with grooves, an input optical fiber of incoming port with its front lens, an optical fiber of pass port with its front lens, an optical fiber of reflect port with its front lens, and a thin-film filter. The optical fibers, lenses, and the thin-film filter are inserted into grooves to complete the fiber-to-fiber alignment.

The WDM of the present invention can act as a wavelength demultiplexer, which is to input two lights with different wavelengths through the same optical fiber, and use the lenses and the filter to split the two lights for outputting through different optical fibers. By reversing the foregoing process, the present invention can also act as a wavelength multiplexer to input two lights through different optical fibers, and use the lenses and filter to detect and reflect so that both lights can be outputted through the same optical fiber.

These and other objects, features and advantages of the invention will be apparent to those skilled in the art, from a reading of the following brief description of the drawings, the detailed description of the preferred embodiment, and the appended claims.

DETAILED DESCRIPTION OF THE PREFERRED EMBODIMENT

Figure 1:
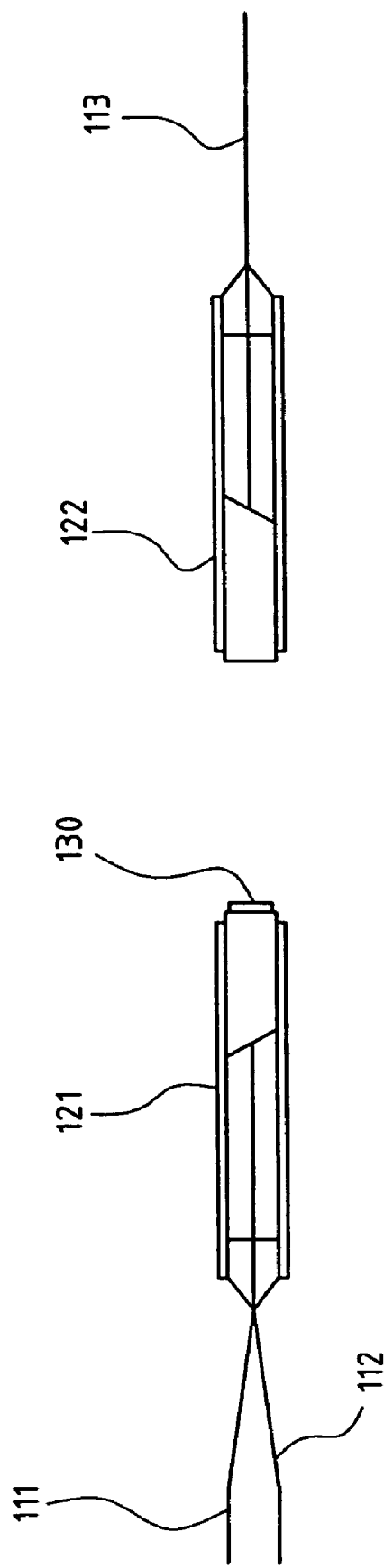
FIG. 1 shows a schematic diagram of a thin-film WDM.
Figure 2:
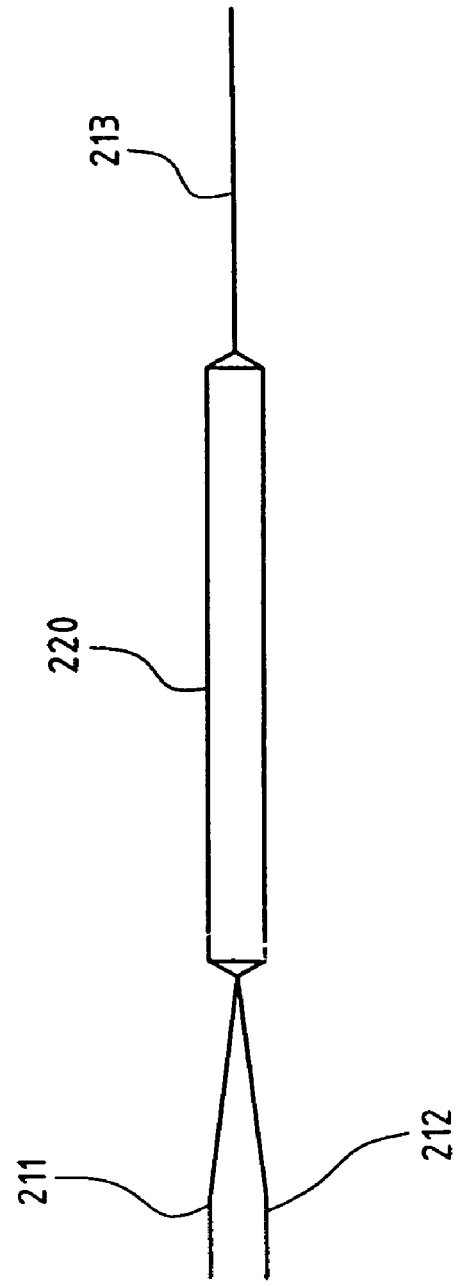
FIG. 2 shows a schematic diagram of a fused biconic tapered WDM.
Figure 3:
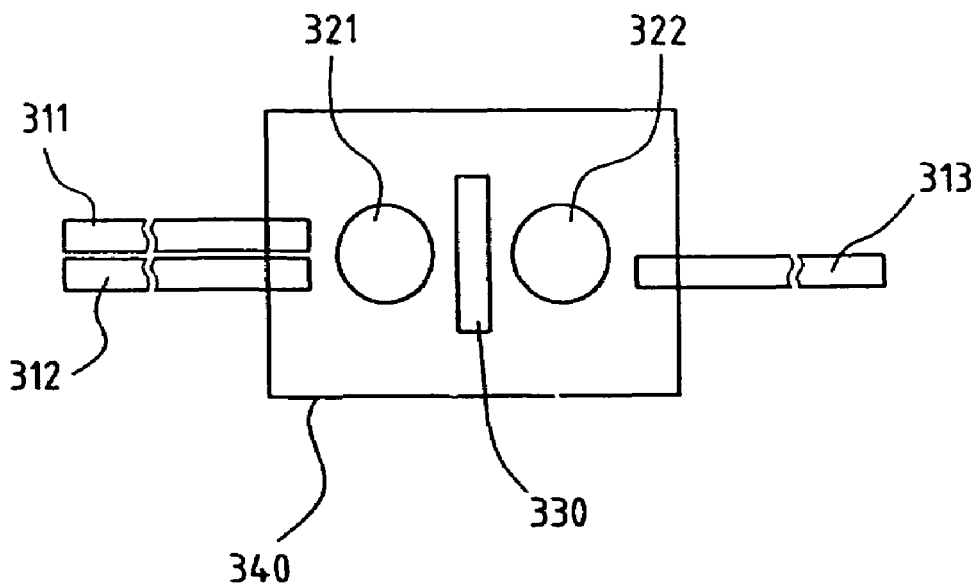
FIG. 3 shows a first embodiment of a silicon optic based WDM of the present invention.

FIG. 3 shows a first embodiment of a silicon optic based WDM of the to present invention. The first embodiment uses a single thin-film filter. The embodiment comprises an input optical fiber 311 at an incoming port with its front lens 321 an output optical fiber 313 at a pass port with its front lens 322, an output optical fiber 312 at a reflect port with its front lens 321, a thin-film filter 330 and a silicon substrate 340. The operational mechanism is to input a first light with wavelength $\lambda 1$ and a second light with wavelength $\lambda 2$ from the same input optical fiber 311, then to focus the lights with the lens 321 to form a parallel ray for transmission through air. When the parallel ray reaches thin-film 330, the first light with wavelength $\lambda 1$ penetrates the thin-film filter 330, reaches lens 322, and focuses into the optical fiber 313 for transmission. On the other hand, the second light with wavelength $\lambda 2$ is reflected back to lens 321, and transmitted through optical fiber 312. Therefore, the first light and the second light that are originally transmitted in the same optical fiber 311, are split and transmitted in separate optical fibers 312 and 313, respectively. This operation accomplishes wavelength demultiplexing.

The wavelength multiplexing function is achieved by reversing the foregoing operation of the present invention. A first light $\lambda 1$ and a second light $\lambda 2$ are input from optical fibers 313 and 312, respectively. By the combination of the lens 322, lens 321, and the thin-film filter 330, the first light is deflected and the second light is reflected into a same optical fiber 311 for transmission.

Figure 4:
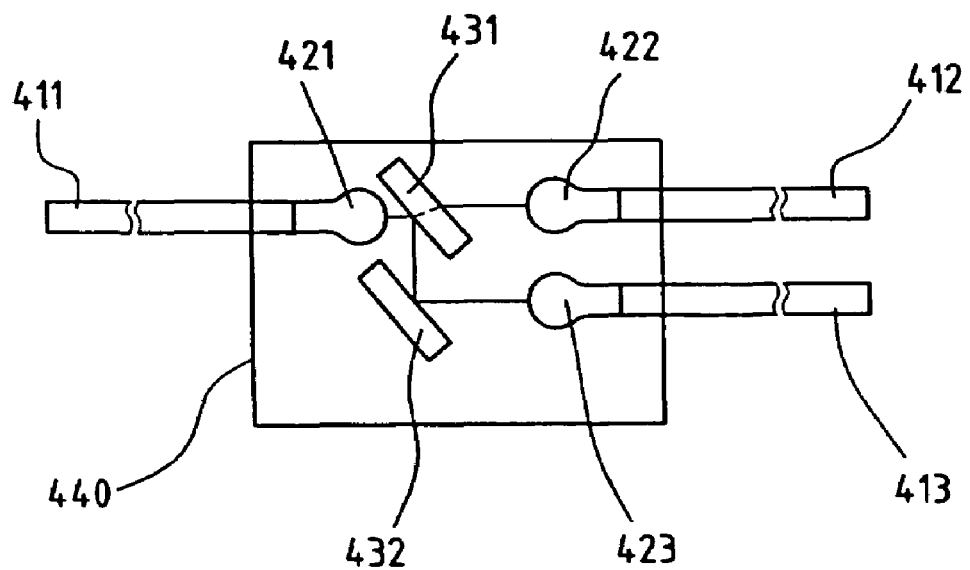
FIG. 4 shows a second embodiment of a silicon optic based WDM of the present invention.

FIG. 4 shows a second embodiment of a silicon optic based WDM of the present invention. The second embodiment uses two thin-film filters. The embodiment comprises an input optical fiber 411 at an incoming port with its front lens 421, an output optical fiber 412 at a pass port with its front lens 422, an output optical fiber 413 at a reflect port with its front lens 423, a first thin-film filter 431, a second thin-film filter 432, and a silicon substrate 440. The operational mechanism is to input a first light with wavelength λ1 and a second light with wavelength λ2 from the same input optical fiber 411, then to focus the lights with the lens 421 to form a parallel ray for transmission to reach the first thin-film 431, the first light with wavelength λ1 penetrates the first thin-film filter 4313 reaches lens 422, and focuses into the optical fiber 412 for transmission. On the other hand, the second light with wavelength λ2 is reflected back to the second thin-film filter 432, then reflected by the second thin-film filter 432 to the lens 423 and transmitted through optical fiber 413. Therefore, the first light and the second light that are originally transmitted in the same optical fiber 411, arc split and transmitted in separate optical fibers 412 and 413, respectively. This operation accomplishes wavelength demultiplexing.

The wavelength multiplexing function is achieved by reversing the foregoing operation of the embodiment. A first light λ1 and a second light λ2 are input from optical fibers 412 and 413, respectively. By the combination of the first thin-film filter 431, and the second thin-film filter 432, the first light is deflected and the second light is reflected into a same optical fiber 411 for transmission.

Figure 5:
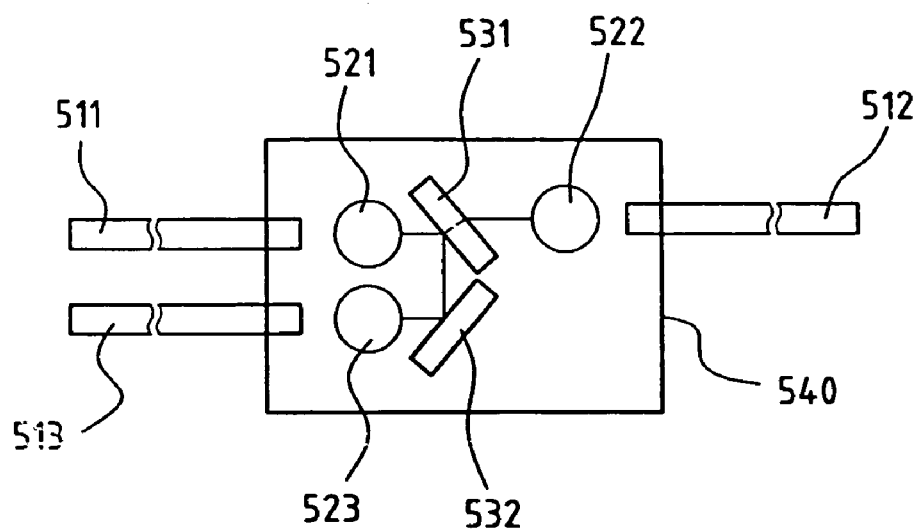
FIG. 5 shows a third embodiment of a silicon optic based WDM of the present invention.

FIG. 5 shows a third embodiment of a silicon optic based WDM of the present invention. The third embodiment uses two thin-film filters. The embodiment comprises an input optical fiber 511 at an incoming port with its front lens 521, an output optical fiber 512 at a pass port with its front lens 522, an output optical fiber 513 at a reflect port with its front lens 523, a first thin-film filter 531, a second thin-film filter 532, and a silicon substrate 540. The operational mechanism is to input a first light with wavelength λ1 and a second light with wavelength λ2 from the same input optical fiber 511, then to focus the lights with the lens 521 to form a parallel my for transmission through the air to reach the first thin-film 531, the first light with wavelength λ1 penetrates the first thin-film filter 531, reaches lens 522, and focuses into the optical fiber 512 for transmission. On the other hand, the second light with wavelength λ2 is reflected back to the second thin-film filter 532, then reflected by the second thin-film filter 532 to die lens 523 and transmitted through optical fiber 513. Therefore, the first light and the second light that are originally transmitted in the same optical fiber 511, are split and transmitted in separate optical fibers 512 and 513, respectively. This operation accomplishes wavelength demultiplexing.

The wavelength multiplexing function is achieved by reversing the foregoing operation of the embodiment. A first light λ1 and a second light λ2 are input from optical fibers 512 and 513, respectively. By the combination of the first thin-film filter 531, and the second thin-film filter 532, the first light is deflected and the second light is reflected into a same optical fiber 511 for transmission.

Figure 6:
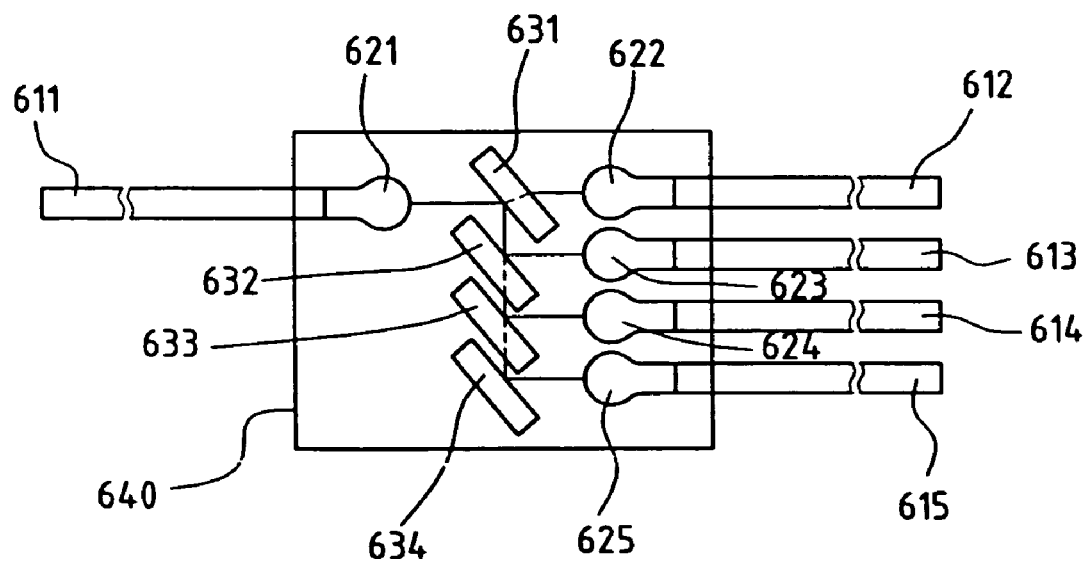
FIG. 6 shows a fourth embodiment of a silicon optic based WDM of the present invention.

The present invention is able to multiplex or demultiplex more than two different wavelengths based on the same structure. FIG. 6 shows a fourth embodiment of a silicon optic based WDM of the present invention. The fourth embodiment uses a plurality of thin-film filters. The embodiment comprises an input optical fiber 611 at an incoming port with its front lens 621, output optical fibers 612, 613, 614, 615 at a pass port with their front lenses 622, 623, 624, 625, a first thin-film filter 631, a second thin-film filter 632, a third thin-film filter 633, a fourth thin-film filter 634, and a silicon substrate 640.

The operational mechanism is to input a first light with wavelength λ1, a second light with wavelength λ2, a third light with wavelength λ3, and a fourth light with wavelength λ4 from the same input optical fiber 611, then to focus the lights with the lens 621 to form a parallel ray for transmission through the air to reach the first thin-film 631, the first light with wavelength λ1 penetrates the first thin-film filter 631, reaches lens 622, and focuses into the optical fiber 612 for transmission. On the other hand, the other lights with wavelength λ2, λ3, λ4 are reflected back to the second thin-film filter 632. The second light λ2 is reflected to the lens 623, and focuses for transmission in optical fiber 613. The third light λ3 and the fourth light λ4 penetrate the second thin-film filter 632 to reach the third thin-film 633. The third light λ3 is reflected by the third thin-film 633 to enter lens 624, and focus into optical fiber 614 for transmission. Then, the fourth light λ4 penetrates the third thin-film filter 633 and reaches the fourth thin-film filter 634. The fourth light λ4 is reflected by the fourth thin-film Alter 634 to the lens 625 and transmitted through optical fiber 615. Therefore, the four lights that are originally transmitted in the same optical fiber 611, are split and transmitted in separate optical fibers 612, 613, 614, and 615, respectively. This operation accomplishes wavelength demultiplexing.

The wavelength multiplexing function is achieved by reversing the foregoing operation of the embodiment. A first light λ1, a second light λ2, a third light λ3, and a fourth light λ4 are input from optical fibers 612, 613, 614, 165, respectively. By the combination of the first thin-film filter 631, the second thin-film filter 632, the third thin-film filter 633, and the fourth thin-film filter 634, the lights are deflected and reflected into a same optical fiber 611 for transmission.

Figure 7:
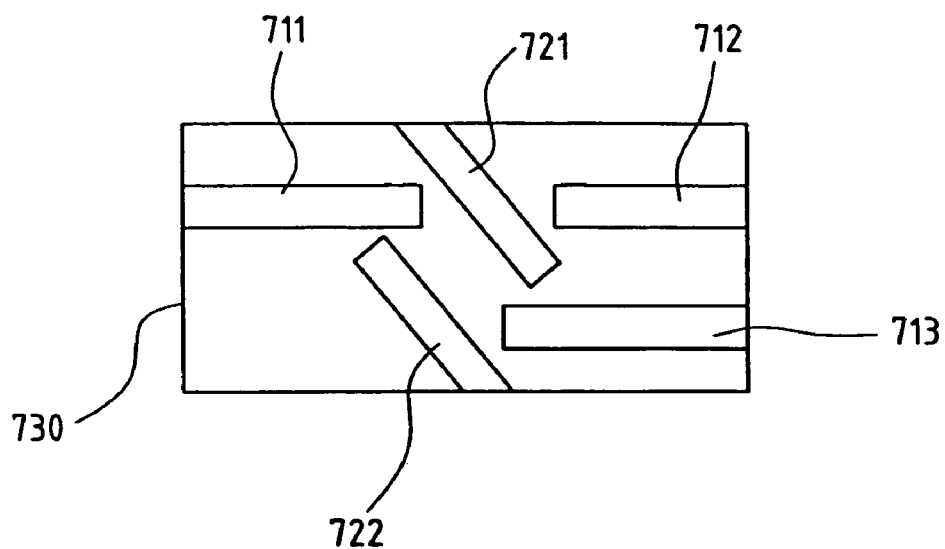
FIG. 7 shows a schematic diagram of the silicon substrate of the present invention.

Furthermore, the silicon substrate of the foregoing embodiments is a silicon substrate comprising grooves, made by a micro lithography and etching process utilizing the special crystal lattice structure of a silicon wafer, FIG. 7 shows a diagram of the silicon substrate. The grooves 711, 712, 713 on the silicon substrate 730 are for inserting optical fibers and lenses. The size of the grooves and the distance between grooves are controlled within the precision of ±0.5 μm. On the other hand, the grooves 721, 722, made by etching or a precise dicing to form specific angles, are for inserting thin-film filters.

Figure 8:
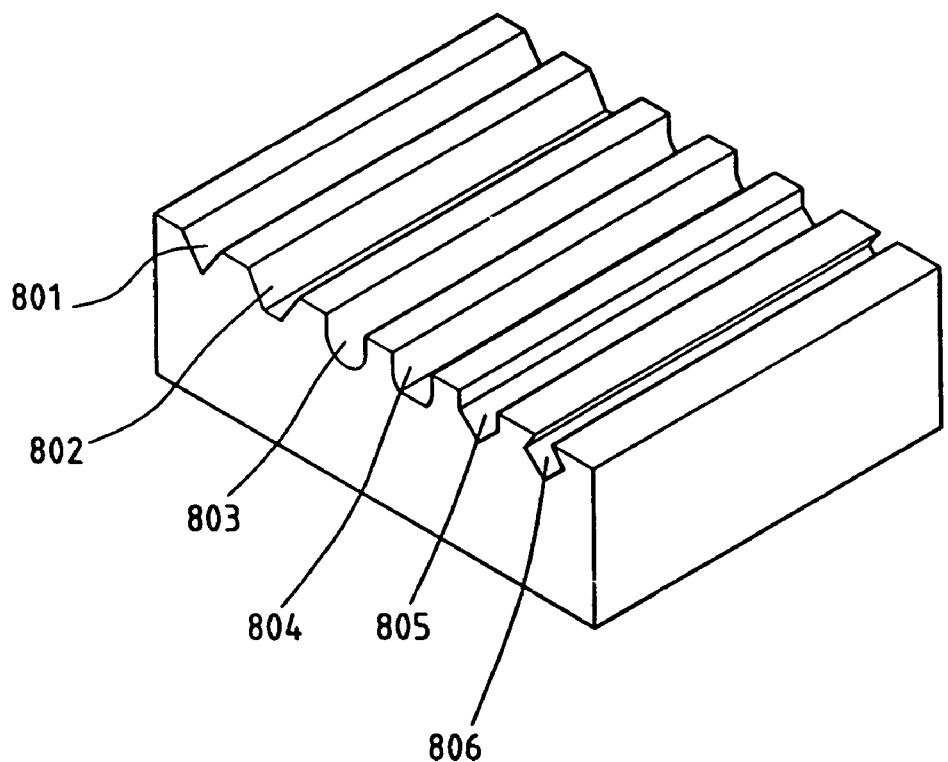
FIG. 8 shows a perspective view of the grooves of the present invention.

FIG. 8 shows a perspective view of the grooves of the present invention. The grooves are V grooves 801, V grooves with flat bottom 802, U grooves 803, U grooves with flat bottom 804, necktie shape grooves 805, and rhombus shape groves 806.

Figure 9A:
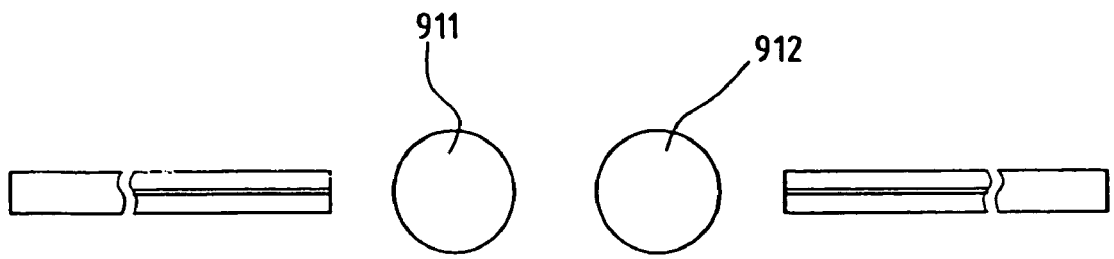
FIG. 9 shows a cross-sectional view of fiber-to-fiber coupling of various types of the present invention.
Figure 9B:
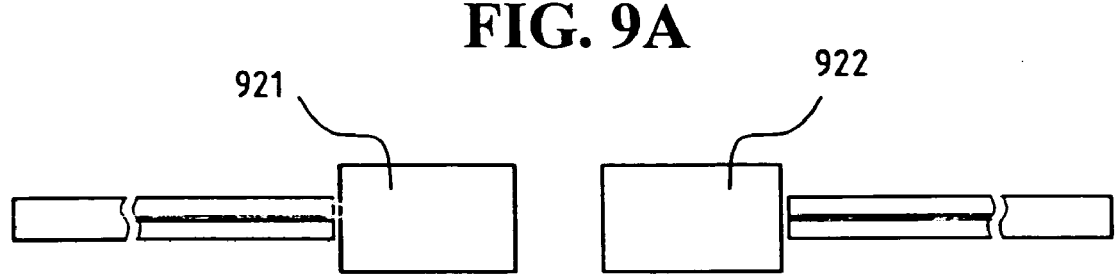
Figure 9C:
Figure 9D:

The fiber-to-fiber coupling of the embodiments of the present invention is done in various ways to reduce the fiber-to-fiber coupling loss. FIG. 9 shows cross-sectional views of various couplings. FIG. 9A shows that the fiber-to-fiber coupling is done by using ball lenses, cylindrical lenses, or aspheric lenses. The cross-sections are shown as 911 and 912. FIG. 9B shows that a fiber-to-fiber coupling is done by lenses with gradient refraction, with cross sections 921, 922. FIG. 9C shows that a fiber-to-fiber coupling is done by piano-convex lenses, with cross-sections 931, 932. FIG. 9D shows that a fiber-to-fiber coupling is done by a lens fiber, formed with a gradient refraction index micro lens and an optical fiber with cross-sections 941, 942.

Figure 9E:
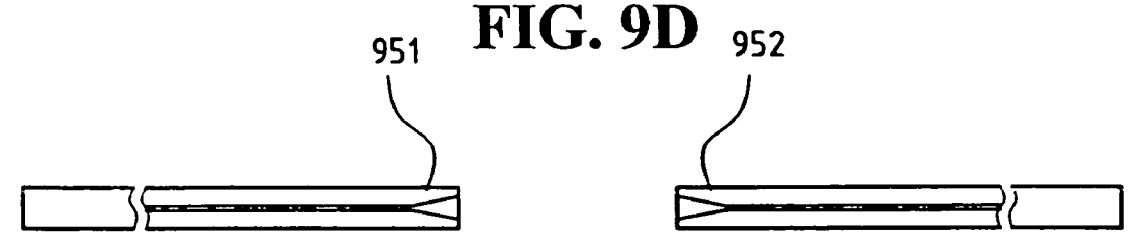

The lens fiber is formed by fusing a micro lens with an optical fiber. Alternatively, a lens fiber is also formed by treating the rip of an optical fiber so that it can act as a lens. A lens fiber can be classified as conic lens, ball lens, aspheric lens, piano-convex, or thermal expanded core fiber. The cross sections 951, 952 of a thermal expanded cure fiber are shown in figure 9E.

While the invention has been described in connection with what is presently considered to the most practical and preferred embodiment, it is to be understood that the invention is not to be limited to the disclosed embodiment, but, on the contrary, it should be clear to those skilled in the art that the description of the embodiment is intended to cover various modifications and equivalent arrangement included within the spirit and scope of the appended claims.

What is claimed is:

1. A silicon optic based wavelength division multiplexer (WDM) device, comprising:
   a silicon substrate, having a plurality of grooves;
   a plurality of optical fibers disposed and coupled inside the grooves of the silicon substrate;
   a plurality of lenses disposed and coupled inside the grooves of the silicon substrate for coupling the optical fibers, and for focusing and diverging lights transmitted by the optical fibers; and
   at least a filter disposed and coupled inside the grooves of the silicon substrate for passing or reflecting lights with different wavelengths;
   wherein the filter is an external filter inserted in the grooves of the silicon substrate.

2. The device as claimed in claim 1, wherein the lenses are lens fiber.

3. The device as claimed in claim 2, wherein the lens fiber is formed by fusing micro lens and an optical fiber.

4. The device as claimed in claim 2, wherein the lens fiber is formed by treating the tip of an optical fiber so that the tip acts as a lens.

5. The device as claimed in claim 2, wherein the lens fiber is a conic lens.

6. The device as claimed in claim 2, wherein the lens fiber is a ball lens.

7. The device as claimed in claim 2, wherein the lens fiber is an aspheric lens.

8. The device as claimed in claim 2, wherein the lens fiber is plano-convex-shaped.

9. The device as claimed in claim 2, wherein the lens fiber is a thermal expanded core fiber.

10. The device as claimed in claim 2, wherein the filter is a thin-film filter.

11. The device as claimed in claim 1, wherein the lenses are cylindrical lenses.

12. The device as claimed in claim 1, wherein the lenses are aspheric lenses.

13. The device as claimed in claim 1, wherein the lenses are lenses with gradient refraction index.

14. The device as claimed in claim 1, wherein the lenses are plano-convex lenses.

15. The device as claimed in claim 1, wherein the grooves are formed by etching.

16. The device as claimed in claim 1, wherein the lenses are a combination of ball lenses, cylindrical lenses, aspheric lenses, lenses with gradient refraction index, plano-convex lenses, and lens fiber.

17. The device as claimed in claim 1, wherein the grooves are formed by precise dicing.

18. The device as claimed in claim 1, wherein the grooves are V-shaped grooves.

19. The device as claimed in claim 1, wherein the grooves are V-shaped grooves with flat bottom.

20. The device as claimed in claim 1, wherein the grooves are U-shaped grooves.

21. The device as claimed in claim 1, wherein the grooves are U-shaped grooves with flat bottom.

22. The device as claimed in claim 1, wherein the grooves are necktie-shaped grooves.

23. The device as claimed in claim 1, wherein the grooves are rhombus-shaped grooves.

24. The device as claimed in claim 1, wherein the lenses are ball lenses.

25. A silicon optic based wavelength division multiplexer (WDM) device, comprising:
    a silicon substrate, having a plurality of grooves;
    a plurality of optical fibers disposed and couple inside the grooves of the silicon substrate;
    a plurality of lenses disposed and coupled inside the grooves of the silicon substrate for coupling the fiber optics, and for focusing and diverging lights transmitted by the fiber optics; and
    at least a filter disposed and coupled inside the grooves of the silicon substrate for passing or reflecting lights with different wavelengths;
    wherein the filter is an external filter inserted in the grooves of the silicon substrate.

26. The device as claimed in claim 25, wherein the grooves are formed by etching.

27. The device as claimed in claim 25, wherein the grooves are formed by precise dicing.

28. The device as claimed in claim 25, wherein the grooves are V-shaped grooves.

29. The device as claimed in claim 25, wherein the grooves are V-shaped grooves with flat bottom.

30. The device as claimed in claim 25, wherein the grooves are U-shaped grooves.

31. The device as claimed in claim 25, wherein the grooves are U-shaped grooves with flat bottom.

32. The device as claimed in claim 25, wherein the grooves are necktie-shaped grooves.

33. The device as claimed in claim 25, wherein the grooves are rhombus-shaped grooves.

34. The device as claimed in claim 25, wherein the lens fiber is formed by fusing micro lens and an optical fiber.

35. The device as claimed in claim 25, wherein the lens fiber is formed by treating the tip of an optical fiber so that the tip acts as a lens.

36. The device as claimed in claim 25, wherein the lens fiber is a conic lens.

37. The device as claimed in claim 25, wherein the lens fiber is a ball lens.

38. The device as claimed in claim 25, wherein the lens fiber is an aspheric lens.

39. The device as claimed in claim 25, wherein the lens fiber is plano-convex-shaped.

40. The device as claimed in claim 25, wherein the lens fiber is a thermal expanded core fiber.

41. The device as claimed in claim 25, wherein the filter is a thin-film filter.

* * * * *